United States Patent
Lawrenson et al.

(10) Patent No.: US 6,230,420 B1
(45) Date of Patent: May 15, 2001

(54) RMS PROCESS TOOL

(75) Inventors: Christopher C. Lawrenson; Timothy S. Lucas, both of Richmond; Thomas W. VanDoren, Fredericksburg; James N. Wisner, Richmond, all of VA (US)

(73) Assignee: Macrosonix Corporation, Richmond, VA (US)

( * ) Notice: Subject to any disclaimer, the term of this patent is extended or adjusted under 35 U.S.C. 154(b) by 0 days.

(21) Appl. No.: 09/184,268

(22) Filed: Nov. 2, 1998

Related U.S. Application Data (63) Continuation-in-part of application No. 08/979,931, filed on Nov. 26, 1997, now Pat. No. 5,954,854.

(51) Int. Cl.⁷ ...................................................... F26B 5/14
(52) U.S. Cl. .............................. 34/401; 34/256; 34/257; 34/258; 34/279; 34/164
(58) Field of Search ........................... 34/245, 255, 256, 34/257, 258, 279, 164, 397, 401

(56) References Cited

U.S. PATENT DOCUMENTS

| | | | |
|---|---|---|---|
| 4,071,225 | 1/1978 | Holl | 366/144 |
| 5,174,130 | * 12/1992 | Lucas | 62/498 |
| 5,225,089 | * 7/1993 | Benes et al. | 210/748 |
| 5,316,076 | 5/1994 | Sandström et al. | 165/84 |
| 5,319,938 | 6/1994 | Lucas | 62/6 |
| 5,515,684 | * 5/1996 | Lucas et al. | 62/6 |
| 5,515,864 | 5/1996 | Zuckerman | 128/633 |
| 5,579,399 | * 11/1996 | Lucas | 381/165 |
| 5,626,767 | * 5/1997 | Trampler et al. | 210/748 |
| 5,711,888 | * 1/1998 | Trampler et al. | 210/748 |
| 5,803,270 | * 9/1998 | Brodeur | 209/155 |
| 5,994,854 | * 11/1999 | Lawrenson | 318/114 |

OTHER PUBLICATIONS

WO 95 01214 A (Univ British Columbia; Sonosep Biotech Inc (CA); Trampler Felix (A) Jan. 12, 1995 abstract; figure 1,8.

Database Inspec 'on line! Institute of Electrical Engineers, Stevenage, GB Lawerencson C C et al: "Measurements of macrosonic standing waves in oscillating closed cavities" Database accession no. 5995203 XP002136880 abstract & Journal of the Acoustical Society of America, Aug. 1998, Acoust. Soc. America Through AIP, USA, vol. 104, No. 2, pp. 623–636, ISSN: 00–4966.

* cited by examiner

Primary Examiner—Pamela Wilson
(74) Attorney, Agent, or Firm—Foley & Lardner

(57) ABSTRACT

Physical effects produced within RMS resonators are utilized as a means to process materials within the resonator including for example one or more of comminution, converting liquids into vapors and gases, drying of powders, rapid mixing of gases and various materials, agglomeration, de-agglomeration, granulation, chemical reactions, stratification/separation, and the destruction of biological material.

27 Claims, 4 Drawing Sheets

RMS PROCESS TOOL

The instant application is continuation-in-part of Ser. No. 08/979,931, filed Nov. 26, 1997, now U.S. Pat. No. 5,994,854.

BACKGROUND OF THE CURRENT INVENTION

1) Field of Invention

This invention relates to the application of Resonant Macrosonic Synthesis (RMS) for the purposes of processing materials within an RMS resonator including, for example, comminution, converting liquids into vapors and gases, drying of powders, mixing of dissimilar materials, agglomeration, de-agglomeration, granulation, sterilization of gases, destruction of biological materials, separation by stratification, and coal gasification.

2) Description of Related Area

Previously, the processing of materials such as comminution, converting liquids into vapors and gases, drying of powders, rapid mixing of gases and various materials including mixtures of particulate solids, agglomeration, de-agglomeration, and granulation required a wide range of different processing equipment. Examples of such equipment can include rotary cutters, hammers, rollers, fluid-energy mills, ovens, and various filtration machines.

If the manufacture of a product requires more than one of these processes, then the product will often be progressively transferred from one machine to another. This can create disadvantages, due to reduced yield, product contamination, longer process time, and high production costs and worker exposure to processing agents.

A single process tool that can provide multiple process steps without product transfer and in a simpler manner would provide a significant advantage to the process industry.

SUMMARY OF THE INVENTION

It is the object of an embodiment of the present invention to utilize the physical effects produced within RMS resonators as a means to process materials within the resonator including for example one or more of comminution, converting liquids into vapors and gases, drying of powders, rapid mixing of gases and various materials, agglomeration, de-agglomeration, granulation, chemical reactions, stratification/separation, and the destruction of biological material.

A further object of an embodiment of the invention is to provide a method for processing materials in a self-contained, sealed tool for batch.

A still further object is to provide a process tool capable of generating a broad range of physical effects, such that multiple process steps can be performed within a self-contained, sealed tool, which may include simultaneous and sequenced process in a batch and/or continuous manner.

Yet another object of an embodiment of the invention is to apply an RMS acoustic process tool to process materials.

The RMS acoustic process tool (APT) of the present invention consists of an RMS system including an acoustic resonator capable of producing: an extremely large range of dynamic pressures, both pumping and levitation via nonlinearly-generated DC pressures, high acoustic particle velocities, streaming velocities, and turbulence. The APT also includes an entire-resonator drive system capable of providing the power necessary to produce these effects.

The shape of the APTs resonator is chosen to promote the specific effect(s) listed above, which will provide the desired process or processes. Inside the resonator is a fluid that serves as the medium within which an acoustic standing wave is created. The fluid can consist of a liquid, a gas, a vapor, a vapor-gas mixture, a liquid or particulate aerosol, or a mixture of any number of the forgoing fluids. The method of operation is such that as the actuator oscillates the entire resonator at the frequency of one of its acoustic modes, a standing acoustic wave is produced.

One of the advantages of the APT is the number of different process that can be performed within the same tool during a single processing session. Materials within the resonator are exposed to physical effects, such as high dynamic pressures, levitation via nonlinearly-generated DC pressures, acoustic particle velocities, streaming velocities, and turbulence. The relative magnitude of these effects is determined by the resonator's shape and the power delivered Depending upon the materials introduced into the resonator, these physical effects promote various types of processing including one or more of: the size reduction of solid matter (comminution), agglomeration, de-agglomeration, granulation, the vaporization/atomization of liquids, the drying of powders, the nixing of dissimilar materials such as gases, vapors, and powders, destruction of biological material, and chemical reactions.

The rate at which these processes occur can be controlled by varying the power delivered to resonator. Many of these individual process can be combined to occur concurrently or in a desired sequence within a single APT by varying the input power level.

Another advantage of the APT is that the high kinetic energy required for certain processes such as rapid mixing, rapid de-agglomeration, and communition are created within the resonator via the stored energy of the standing wave. This internal energy source eliminates the need for external energy sources that are outside of the tool, such as external pumps or compressors.

These and other objects and advantages of the invention will become apparent from the accompanying drawings, wherein like reference numerals refer to like parts throughout.

DETAILED DESCRIPTION OF THE PREFERRED EMBODIMENTS

Figure 1:
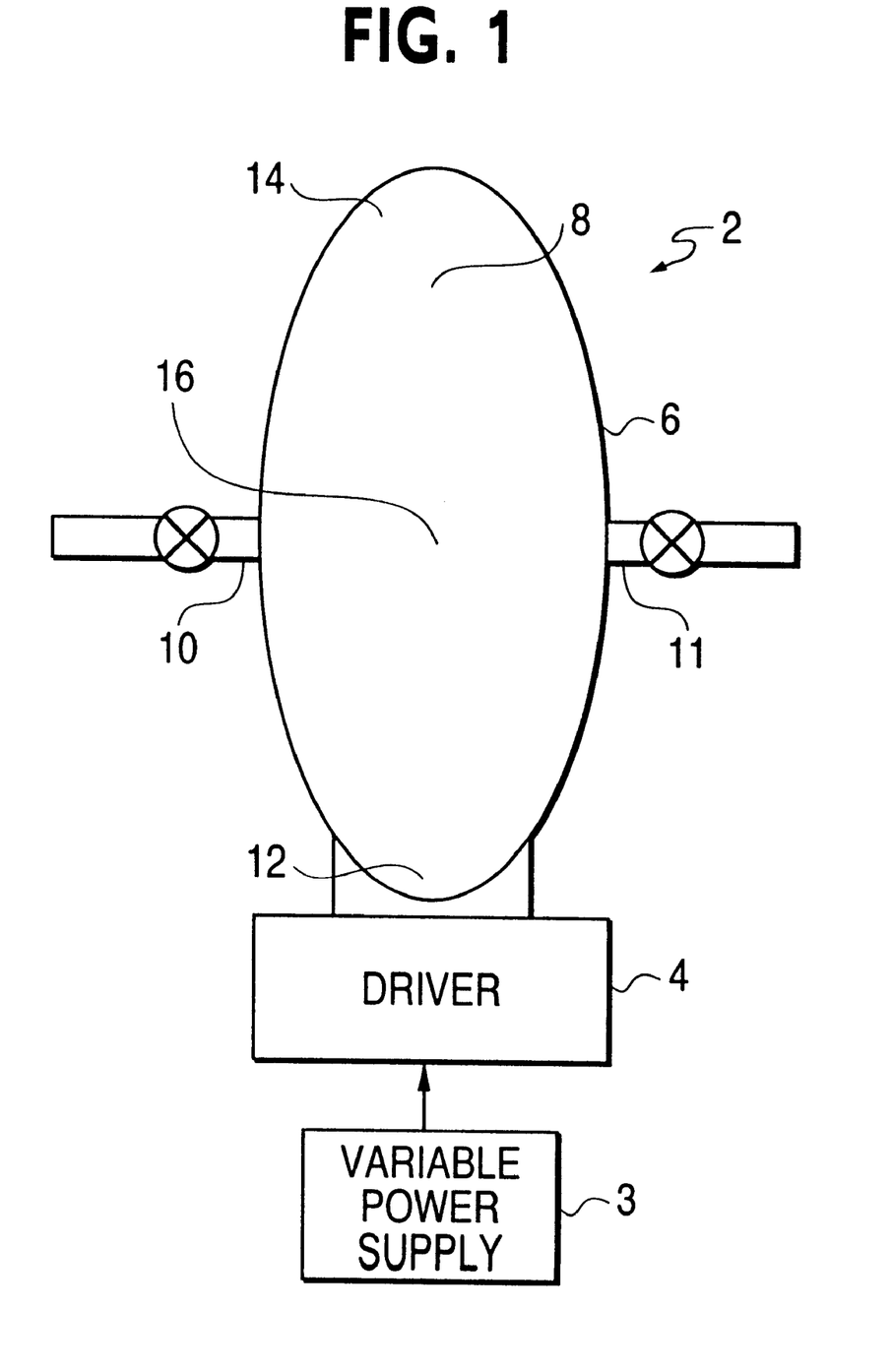
FIG. 1 is a sectional view of an acoustic process tool (APT) in accordance with the present invention.
Figure 5:
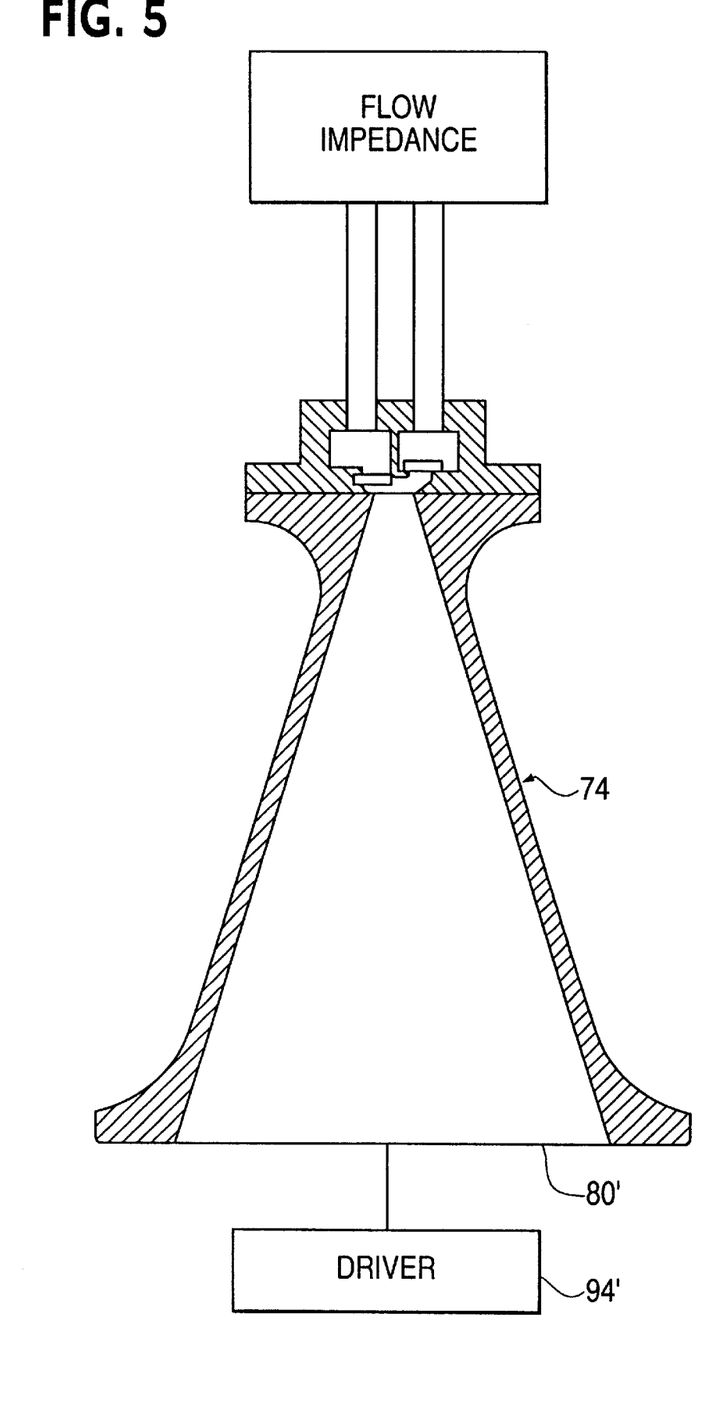
FIG. 5 shows an alternate piston arrangement for driving the resonator.

FIG. 1 illustrates an acoustic process tool (APT) 2 having driver 4 and resonator 6 being constructed so as to provide a sealed (air-tight) chamber and being filled with a fluid. Materials to be processed are placed in the interior 8 of resonator 6. The material to be processed can be added to resonator 6 in many ways as for example through conduit 10, which can be located anywhere on the process tool 2. In general, the internal geometrical shape of resonator 6 will determine the pressure and velocity distributions and waveforms within interior 8 as described in U.S. Pat. No. 5,515,684 incorporated herein by reference. Entire resonator driving, as illustrated in FIG. 1, is described in U.S. Pat. No. 5,515,684, U.S. Pat. No. 5,319,938, and U.S. patent application Ser. No. 08/979,931 now U.S. Pat. No. 5,994,854, the entire contents of which are all hereby incorporated by reference. FIG. 5 is derived from FIG. 15B of U.S. Pat. No. 5,515,684, and illustrates an alternate driving mechanism for the RMS resonator 74 using piston or diaphragm 80' and electromagnetic driver 94'. The scope of the present invention is not limited to the shape of resonator 6 in FIG. 1, but instead can have an infinite variety of shapes. The specific resonator shape and its resulting characteristics will be chosen by the designer to fulfill the requirements of a particular application.

In operation driver 4 oscillates resonator 6 at the frequency of an acoustic standing wave mode thereby creating a standing acoustic wave within resonator 6. The driver is supplied with a variable power supply 3 to permit control of the acoustic energy within the chamber. In this way standing waves with extremely high energy densities can be generated, which provide a range of physical effects employed by the present invention. The physical effects produced include one or more of high dynamic pressures, high ambient temperatures, high dynamic temperatures, levitation via nonlinearly-generated DC pressures, high acoustic particle velocities, high streaming velocities, and turbulent flow volumes of high scale that can fill a substantial portion of the resonator's internal volume. U.S. Pat. No. 5,515,684 teaches that excessive turbulence can increase the energy dissipation within a resonator and also teaches methods to minimize the turbulence. For certain RMS applications, such as acoustic compressors, energy efficiency can be increased by minimizing turbulence. In contrast, many of the processes of the present invention are enhanced by the turbulence that is easily created by the high acoustic velocities that RMS resonators can provide.

RMS resonators generate the high energy densities and physical effects required for APT's to function and enable the new processing approaches that ATP's provide. These physical effects and their application to particular processes are described as follows.

1) Comminution

Acoustic comminution is facilitated by high amplitude standing waves that produce high acoustic velocities, high streaming velocities, turbulent flow, and levitation.

The acoustic standing wave exists in the host gas that fills resonator 6. The host gas can be air or any number of other gases and will be at a pressure that is appropriate for a given process. Assuming for example that the first longitudinal mode of resonator 6 is excited, then the host gas within the resonator will oscillate back and forth along the resonator's cylindrical axis, changing direction twice during a single acoustic cycle. In RMS resonators, these oscillating axial velocities can approach and potentially exceed the quiet condition sound speed (MACH 1) in that gas.

Other flows within the gas that exert forces on the process particles are nonlinearly-driven streaming velocities and turbulent flow. At high acoustic amplitudes streaming flow loops are generated between pressure nodes and anti-nodes and are also created by the particles themselves. The streaming velocities created by the particles can exceed the node-to-antinode streaming velocities. Also, at high amplitudes the oscillating axial flow transitions from laminar flow to turbulent flow.

Figure 4:
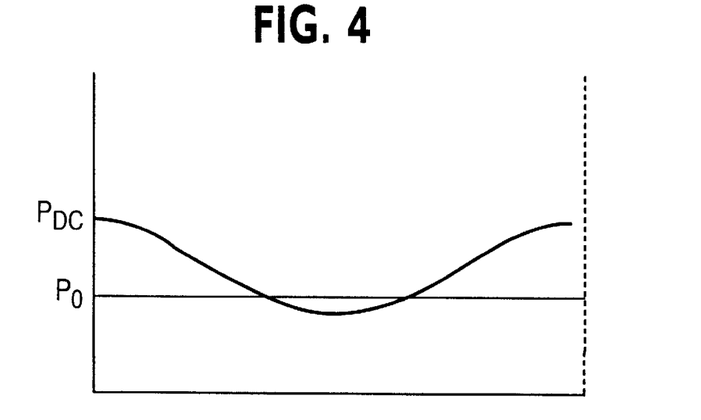
FIG. 4 is a graphical representation of the DC pressure distribution within the APT of FIG. 3.

Another effect due to the presence of the high amplitude acoustic wave within resonator 6 is the nonlinearly driven, so called, "DC pressure." As known to those skilled in the art, the DC pressure varies along the axis of the resonator forming a static pressure gradient. This static gradient can levitate objects within the resonator. The shape and symmetry of resonator 6 will result in a DC pressure distribution having a maxima at ends 12 and 14 and a minima at the half-length point 16. FIG. 4 illustrates the type of static pressure distribution that would be expected within resonator 6. This DC pressure gradient will tend to push the process particles away from ends 12 and 14 and towards the center of resonator 6.

When the particles to be comminuted are placed within resonator 6 of FIG. 1 they are typically subjected to all of the forces described above. Levitation tends to push the process particles away from ends 12 and 14 and keeps them where oscillating axial flow, turbulent flow, and streaming flows are high The oscillating axial flow will exert a force on the process particles that will tend to move them in the direction of the instantaneous axial flow. As the particle is accelerated back and forth in response to these oscillating axial forces it is also propelled through the turbulent flows and streaming flows. The particle itself also creates streaming flows that in turn create further unbalanced forces that will accelerate the particle.

Consequently, the process particles experience collisions with the walls of resonator 6 and with each other. RMS resonators can provided energies high enough such that these particle-wall and particle-particle collisions will break the process particles into smaller pieces, and thereby provide comminution. The present invention has been used to comminute materials such as whole coffee beans, salt, sugar, and other materials. Micron and sub-micron (i.e. nano-phase) sizes can be achieved.

The actual velocities achieved by the process particles will vary inversely with particle size. When particles are first introduced within resonator 6, their oscillating axial displacement will typically be a fraction of the host gas' displacement.

It is the nature of an APT that nearly all of the resonator's interior volume can be substantially filled with high velocity flow so that process particles are almost continually undergoing comminution. In this way the results of the process are enhanced and rapid efficient comminution is provided.

The APT comminution process can be employed in many processes such as the comminution of pharmaceutical agents, manufacture of printer toner, gasification of coal, recovery of precious metals from stone and other geological specimens, and plastics recycling.

2) Destruction of biological materials

The extremely high dynamic, pressures, dynamic temperatures, axial and turbulent velocities generated within an RMS resonator can be used to sterilize air and other gases by destroying bacteria and viruses via exposure to high temperatures and through high energy impacts as previously described for comminution.

3) Agglomeration and de-agglomeration

As acoustic amplitudes are increased from very low levels, the different physical effects previously described will vary in magnitude. At amplitudes low enough to avoid substantial turbulence, the combined effects of levitation and acoustically generated flows will lead to agglomeration of particulate process materials. Applications for agglomeration include pollution abatement through the removal of ash and other combustion products from air. Also, by injecting a granulation-promoting substance (a "binder" as it is commonly called) inside of resonator 6 of FIG. 1, granulation can be accomplished inside the APT.

When the acoustic amplitudes are increased beyond the agglomeration level the agglomerated materials within resonator 6 of FIG. 1 will be de-agglomerated in the same manner and according to the same principles as described above for comminution. If so desired, low amplitude agglomeration inside the APT can be avoided by starting the process at energy levels high enough for de-agglomeration. For many applications, de-agglomeration involves the breaking of weak bonds between preexisting particles which were formed prior to the de-agglomeration process. As such, the acoustic amplitudes required for de-agglomeration will be less than those required for comminution. This will be the case for applications such as pharmaceutical processing where care must be taken not to alter the de-agglomerated particle size nor to alter the properties of the process materials with excessive temperatures and pressures. The APT can be adjusted to run at the energy level appropriate for a given application by reducing the drive power to the motor.

Figure 2:
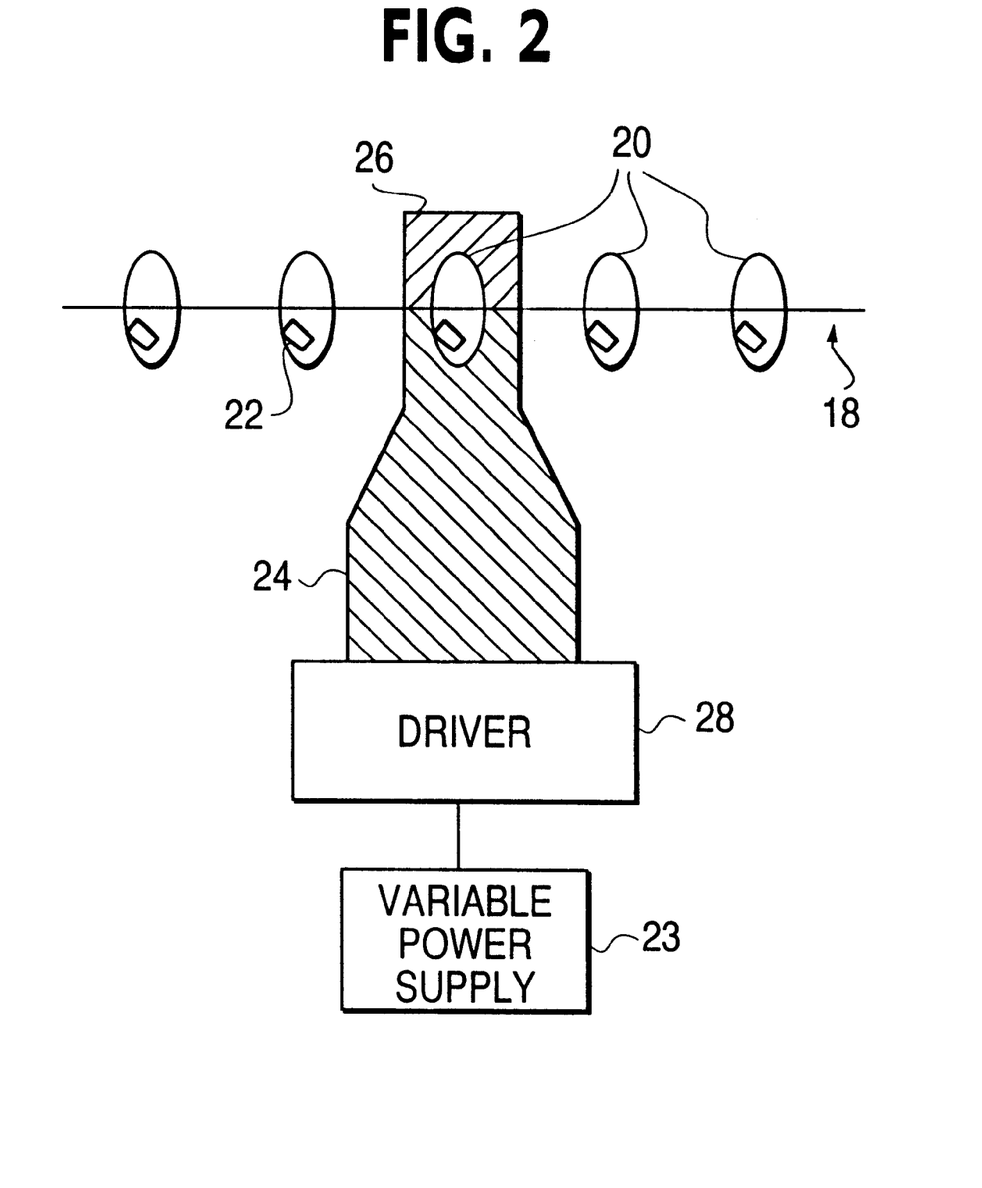
FIG. 2 is a partially sectional view of a batch operation as applied to the de-agglomerating of a pharmaceutical cake inside of a blister.

De-agglomeration applications are found for example in the pharmaceutical industry both for continuous and batch operations. One particular manufacturing process results in an agglomerated cake inside of a sealed blister as shown in FIG. 2. The cake must be de-agglomerated into a powder to place the product in its intended form for use. In FIG. 2 a pharmaceutical blister pack or strip 18 includes a series of blisters 20 with each blister 20 containing an agglomerated cake 22. In this embodiment of the present invention, each blister 20 is supported on blister strip 18 and serves as the resonator. Each blister 20 is filled with an appropriate gas and has a shape that is designed to provide acoustic de-agglomeration as previously described. A blister volume is typically less than 1 cc and contains an agglomerated cake of even smaller volume. Entire resonator drive is employed via ultrasonic horn 24, which is driven by ultrasonic driver 28 connected to variable power supply 23. Axial displacements of the horn are small enough to allow the blisters to remain connected to the blister strip during resonant driving. Many other types of drivers can also be used Horn 24 is temporarily but rigidly joined to horn cap 26 during resonant driving. Ultrasonic horn 24 and horn cap 26 are shown in cross section and provide a means to oscillate the entire blister 20 along its cylindrical axis at the desired resonance frequency and also provide extra rigidity to blister 20 if needed.

To minimize electronic controls the ultrasonic horn can be swept through the blister's resonance frequency once or multiple times to excite the acoustic mode and de-agglomerate the cake. The sweep rate would be adjusted so as to allow the acoustic amplitude within blister 20 to reach the appropriate level for de-agglomeration. This process can be automated into steps so that horn 24 and horn cap 26 separate and retract after de-agglomeration of a blister, the sheet of blisters is advanced and horn 24 and horn cap 26 reengage the next blister. Many transducers can be operated in parallel at once to increase the yield of the same process.

4) Reduction of liquid-to-vapor and liquid-to-gas

The process of vaporizing liquids is accomplished, within resonator 6 of FIG. 1, in the same manner and according to the same principles as described above for comminution. RMS resonators can provide enough energy not only to vaporize liquids into droplets but to further reduce droplets to the gas phase. As in the case of de-agglomeration, care must be taken to use the energy required to provide the desired result, whether it be a vapor, a gas, or disassociated molecules The APT can be adjusted to run at the energy level appropriate for a given application by reducing the drive power to the motor.

Typical applications can include vaporization of fuels for combustion processes and combustion engines; vaporization of liquids for chemical, pharmaceutical, food and beverage, materials science, and electronic device manufacturing; and vaporization for respiratory drug delivery, where liquid and solid particulate aerosols must be created.

5) Mixing of various process materials

The process of mixing various materials, such as liquid vapors, gases, and powders is accomplished, within resonator 6 of FIG. 1, in the same manner and according to the same principles as described above for comminution. APTs can rapidly generate high-density aerosols. The complex flow field created by the superposition of the oscillating axial flow, the turbulent flow, and the streaming flows can provide extremely rapid mixing of various materials. For each particular combination of process materials, care should be taken to use energy levels that will not alter the desired properties of the materials.

Typical applications include rapid gas mixing for chemical and pharmaceutical applications, rapid fuel-air mixing for combustion engines and other combustion processes, and mixing of gases and nanophase particles for film depositions, and electronic device manufacturing processes.

6) Drying

The physical effects previously described for comminution will accelerate the drying of process materials. A drying process within a APT may require a flow of dry and/or heated gas through the tool. In FIG. 1, a superimposed dry gas flow can be provided by pumping the dry gas into resonator 6 via tube 10 and allowing the used gas to exit resonator 6 through tube 11. The application of microwaves provides another means of applying heat to the process materials during processing, wherein the resonator can act as a microwave cavity. While RMS resonators provide the advantage of a sealed system, they can also operate when opened to the external environment as required by the presence of tubes 10 and 11. The tubes can be provided with appropriate filters to prevent any loss of the process materials.

7) Abrasion or "sand blasting"

Abrasive particulates can be used within the APT to "sand blast" a solid object rigidly fixed within the resonator. Repeated high velocity impacts of such abrasive particulates with the surface of the solid object will result in the abrasion of the object's surface. In this way, highly complex shapes may be processed so as to, for example, clean the object of scale, paint, rust, oxides, and other undesired surface coatings without exposure of human operators to dust and particulates resulting from the abrasion process.

8) Chemical processes

The process tool of the present invention can also be used to drive chemical reactions. RMS resonators can provide extremely high dynamic pressures, dynamic temperatures, and kinetic energies for use in enhancing chemical reactions.

For example, the process time required for thermally-driven chemical reactions will normally include time for heating and cooling the reactor. Thermally-driven chemical reactions can be controlled in a new way in the APT. The high dynamic temperatures generated within a RMS resonator can be used to turn a chemical reaction off and on at the acoustic frequency. By varying the input power to the resonator the dynamic temperature amplitude can be varied, which in turn will change the fraction of the acoustic cycle during which the reaction temperature requirement (high or low) is met. Thus, by varying the power input to the resonator, a nearly instantaneous control over the rate of reaction would be provided.

High kinetic energies achieved within an RMS resonator can be used to accelerate catalytic reactions, when a catalyst is placed within the resonator. A catalyst can be added to the material to be processed, formed on the resonator wall, or added as sheets or plates oriented in the direction of the oscillating axial flow.

When filled with a liquid, the APT has the flexibility to provide cavitation for sono-chemical reactions at ultrasonic frequencies or well below the ultrasonic range. In sonochemistry systems that use ultrasonic sources, it is much more difficult to create uniform cavitation throughout the reactor's volume and to transfer the power needed for commercial practicality. The APT provides a means to fill a very large volume of the reactor (i.e. resonator) with cavitation and to do so at very high power levels.

Other chemical reactions and process steps that may be achieved within an APT include oxidation, reduction, metal coating, metal scrubbingor ablation, dissolution of solids into liquids, crystallization, polymerization, de-polymerization, separation processes such as high-speed pressure swing adsorption, sparging (aeration/deaeration), gas/liquid reactions (chlorination), and VOC abatement. The application of microwaves provides another means of applying heat, or a more complex interaction, during a chemical process, wherein the resonator can act as a microwave cavity.

The batch and continuous methods described previously can also be used for chemical reactions within the APT. Chemical reactions can be combined with many of the previously described processing steps inside the same APT. In short, the APT provides a single tool, or reactor, with which the process engineer can design a wide range of processes that may have previously required multiple tools or reactors.

8) Separation

Stratification by particulate size along the axis of a resonator is well known in the field of acoustics. An APT provides a practical means for delivering large amounts of power and greatly increasing the yield of an acoustic stratification process. This particular use of an APT can be applied to the separation of gases.

9) Enhancing processing results

The degree of axial, streaming, and turbulent velocities can be changed by altering the internal surface finish and internal geometry of the APT's resonator. As described in U.S. Pat. No. 5,515,684 the peak axial velocities achieved, for a given pressure amplitude, will depend on the resonator's overall shape. Once a given shape is chosen, local streaming and turbulent velocities can be altered by changing the internal surface finish, or roughness, and by inserting targets in the flow stream. Increasing the turbulent and streaming velocities can increase the processing rate for applications such as mixing, de-agglomeration, drying, vaporization, and comminution, and thus can provide a significant advantage.

Figure 3:
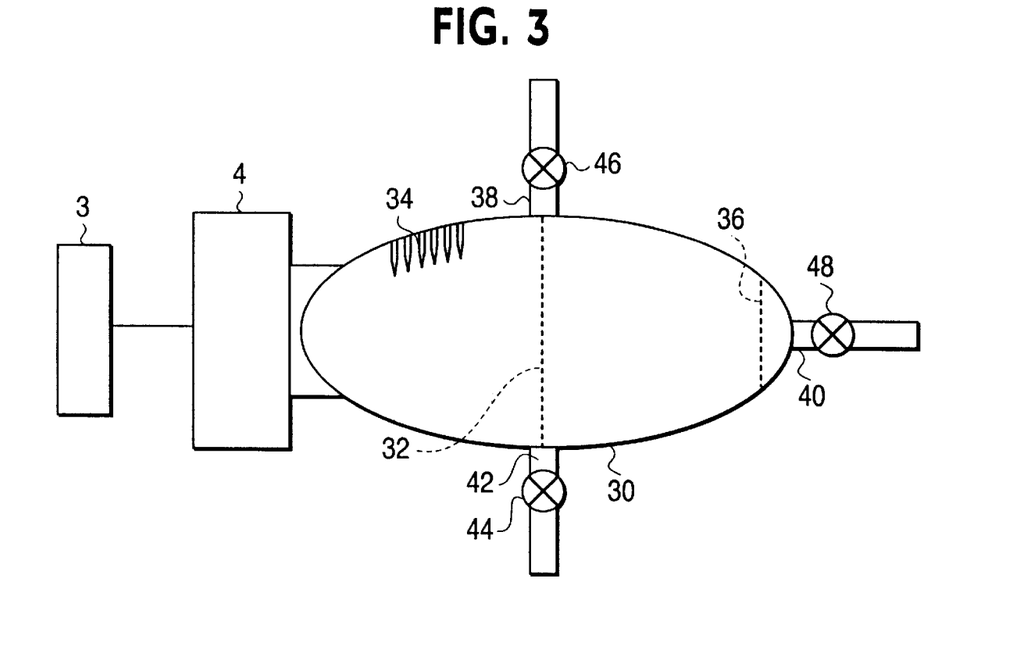
FIG. 3 is a sectional view of an APT in accordance with the present invention that provides various targets for improving process results and various inlet and outlet tubes for either batch or continuous operation.

FIG. 3 shows example embodiments of targets that can be used to increase yield where a resonator 30 has a screen 32 which spans the internal volume of resonator 30 in a direction transverse to the axial acoustic velocities. The mesh size of screen 32 can be chosen so as not to overly impede the axial flow, but to promote the early development of turbulence during a given acoustic cycle. In this way, both the turbulent duty-cycle, with respect to an acoustic cycle, and the turbulent intensity can be increased, thereby providing more processing during a single acoustic cycle. Multiple transverse screens can be added to further accentuate the effect. Surface protrusions 34 provide another style of target to increase processing performance, by promoting turbulence. The resonator 20 is driven by driver 4 and connected to variable power supply 3 as shown in FIG. 1.

The targets described have a two-fold effect First they will increase the rate of particle-particle collisions as well as their impact velocities and second they can provide increased surface area for particle-resonator collisions.

Many other geometrical arrangements to promote turbulence will suggest themselves to those skilled in the art and are considered to be within the scope of the present invention. It is also understood that the addition of targets is a matter of increasing yield and efficiency and that a RMS resonator can provide the processing features of the present invention without targets.

In general, the location, size, geometry, and quantity of these targets, or obstructions, can be modified to optimize the process as desired. Other approaches can be used to increase the processing rate and to alter the processing characteristics such as the particle size distribution for comminution. For example, passive media, such as beads of various materials, can be placed within the resonator to optimize comminution, mixing, and de-agglomeration. Such enhancements are not limited to a batch mode system, but can also be applied to a continuous mode system described herein.

The APT of FIG. 3 provides outlet tubes 40 and 42 as a means to remove processed materials from the tool. For batch operations, resonator 30 can be fitted with flanges for direct opening of the resonator in order to add and remove process materials. Alteratively, materials can be placed within resonator 30 through inlet tube 38 and valve 46 and can be removed through either outlet tube 42 and valve 44 or through outlet tube 40 and valve 48. During processing, valves 44, 46 and 48 can be closed to provide a sealed processing environment. Removal of processed materials through outlet tube 42 can be assisted by "swept air cleaning" consisting of an external pressure source connected to inlet tube 38 which would create flow through tube 38, into resonator 30, and out through tube 42. In this way the processed materials would be entrained in the flow and carried out of resonator 30.

Another means for discharging the processed materials is to use the nonlinearly generated DC pressure created by the standing acoustic wave inside the resonator. The graph of FIG. 4 illustrates the type of DC pressure distribution that would be expected within resonator 30. $P_o$ represents the at-rest pressure within resonator 30 when no standing wave is present. The curve $P_{DC}$ shows how the local at-rest pressure $P_O$ is altered in the presence of a high amplitude standing wave. Unlike the at-rest pressure $P_O$ the altered static pressure $P_{DC}$ is high at the resonator's ends and lowest at the center of the resonator.

If valves 46 and 48 are opened at the same time, then the DC pressure will discharge gas through tube 40 and draw gas in through tube 38. The resulting flow will entrain the processed materials and discharge them from resonator 30, thus eliminating the need for an external pressure source for sweeping the resonator. Any RMS resonator can provide DC pressure and need not have the specific shape shown in FIG. 3. The placement of inlet tube 38 and outlet tube 40 provides the greatest DC pumping pressure, as illustrated in FIG. 4. However, DC pressure pumping can occur with inlets and outlets being located anywhere along the length of resonator as long as there is a DC pressure difference between the inlet and outlet positions. Multiple inlets and outlets can be used to increase material flow and another outlet tube similar to tube 40 could be located at the other end of resonator 30.

10) Continuous process

In addition to batch processing, the APT of FIG. 3 can also operate in a continuous process mode. An external pressure source can continuously deliver move process materials through tube 38, into resonator 30, and out through tube 42. Process materials can also be continuously delivered by allowing the DC pressure to move them through tube 38, into resonator 30 where processing occurs, and out through tube 40. For both nthe externally-driven and DC pressure-driven versions, the flow rate of the gas through the chamber 32 can be controlled with the respective valves independently from the acoustic processing.

For continuous comminution processes, a classification screen 36 can be added to the APT of FIG. 3 having a mesh size so as to prevent particles from leaving the resonator until they have been reduced to the desired size. By locating classification screen 36 inside resonator 30, a self-cleaning action is provided by the oscillating acoustic flow and pressure, thus preventing clogging of the screen.

Additional parallel layers of classifying screens can be located along the cylindrical axis of resonator 30 having progressively smaller mesh sizes from inlet to outlet. In this way, large initial particles will not have to travel far along the resonator's axis before impacting a screen through which it cannot pass until the particle is broken down to a smaller size. Once reduced in size, it will experience greater axial accelerations and displacements allowing it to hit the next smaller mesh size screen. The process continues until the particle can pass through the last screen mesh.

It is particularly advantageous to use an APT in continuous mode for processes such as therapeutic aerosol generation. Aerosol generators or "nebullizers" used for therapeutic purposes often utilize high velocity air strews to impart the energy needed to create aerosols from liquids. A distribution of droplet sizes is thereby created, only a fraction of which are the correct size for inhalation. In addition, the high velocity air streams required are generally of sufficiently high volumetric flow as to require deceleration by externally placed baffles prior to delivery to a patient. Because the energy needed to break a liquid into droplets is acoustically supplied in an APT, it is possible by varying the geometry of the chamber to independently regulate the air flow through the resonator at a level required for human inhalation and to optimize the air flow velocity so as to entrain only droplets of therapeutic size.

11) Process Control

Every degree of each physical effect created within an RMS resonator can be continuously varied by varying the input power to the motor driving the resonator. Also, a transition can be made from one physical effect to another by varying the power input, as in the case of switching from agglomeration to de-agglomeration and from stratification to mixing. Acoustic stratification of particles by size occurs at lower acoustic amplitudes.

Controls can be provided to select the desired process and adjust its rate by varying power input to the motor. Information regarding percent completion of a given process can be inferred by measured parameters such as power consumption at a reference acoustic pressure amplitude and change in resonant frequency. For example, at a given dynamic pressure amplitude a batch comminution process may require less power as particle sizes are reduced. The periodic addition or discharge of process materials, gases, liquids, vapors, powders and reactants can be automated by those skilled in the art of process control and electromechanical design.

There are many ways to exploit the new features of the present invention that will readily occur to one skilled in the art of process engineering. One of the principal advantages of the APT is provided by the wide range of physical effects that can be generated within a single chamber. As such, there are innumerable ways to combine simultaneous and sequenced processes within a single APT, thereby unifying and simplifying formerly complex processes. For example, a process requiring comminution of solids, mixing the comminuted product with gases and other powders, vaporization of liquid reactants, controlling a chemical reaction, agglomeration, and discharge of the final product can all be performed within a single APT by simply supplying the proper materials and controlling the power input to provide the respective physical effects. The number of other combinations of parallel and sequenced processes that can be realized with an APT is virtually endless but is in fact made possible by the unique features of the present invention. Thus, the performance of multiple complex processes within a single APT is considered to be within the scope of the present invention.

As with any process tool, APTs of varying sizes and designs can be placed in series and used to process materials in stages.

An APT requires no specific physical orientation to create the desired physical effects, and so the designer is free to orient the APT in any manner that facilitates a particular design requirement, such as a gravity feed of process materials or loading and unloading process materials, or controlled entrainment of liquid droplets or solid particulates by a gas flowing through the unit. A resonator can be removed from its driver and used to transport the pressed materials in order to avoid contamination. An APT can be operated at extreme temperatures if required by a particular process and can be heated or cooled with conventional methods, Construction materials can be chosen as appropriate for compatibility with given process materials. The number of resonator shapes that will provide the physical effects described herein is unlimited and the specific shape chosen for a given APT design will reflect the given process or processes of interest.

Resonator size should not be considered as a limitation on the scope of the invention, since resonators can be scaled to extremely small sizes (e.g. micromachines) and to very large sizes capable of delivering thousands of watts of processing power.

Further, modes of operation can involve using a fluidized bed approach to prevent the process materials from becoming acoustically opaque, thereby maximizing the volume of materials that can be loaded into a single resonator, while still being able to excite the standing wave mode.

APT resonators have no mechanical frictional moving parts and so provide great flexibility in materials selection Resonators can be constructed from materials that provide long-life, non-contamination, and non-reactivity such as stainless steel, monel, hastalloy, glass, ceramic or plastic.

Monitoring of APT processes can also be provided by means of transparent windows in the resonator. Windows can be used for noninvasive optical measurements to determine the degree of process completion.

What is claimed is:

1. An acoustic process tool comprising:

a resonator containing a fluid and further containing materials to be processed;

a driver for producing a standing wave in said resonator, said standing wave processing said materials; and means, including said driver and internal wall configuration of said resonator, for avoiding shock wave formation within said resonator.

2. The acoustic process tool of claim 1, wherein de-agglomeration occurs due to said standing wave.

3. The acoustic process tool of claim 1, wherein agglomeration occurs due to said standing wave.

4. The acoustic process tool of claim 1, wherein comminution occurs due to said standing wave.

5. The acoustic process tool of claim 1, wherein liquids introduced into said resonator are vaporized due to said standing wave.

6. The acoustic process tool of claim 5, wherein said standing wave provides enough energy to convert said liquid into gaseous form.

7. The acoustic process tool of claim 1, wherein granulation occurs due to said standing wave.

8. The acoustic process tool of claim 1, wherein drying of material occurs due to said standing wave.

9. The acoustic process tool of claim 1, wherein mixing of materials occur due to said standing wave.

10. The acoustic process tool of claim 9, wherein said materials comprise gases.

11. The acoustic process tool of claim 9, wherein said materials comprise solids and liquids.

12. The acoustic process tool of claim 9, wherein said materials comprise powders.

13. The acoustic process tool of claim 1, wherein said materials comprise solids and liquids.

14. The acoustic process tool of claim 1 wherein said resonator includes a piston as part of the internal wall configuration and said driver is coupled to said piston for oscillating said piston.

15. The acoustic process tool of claim 1 wherein the step of producing said standing wave includes oscillating the entire resonator.

16. An acoustic resonator comprising:

a resonator containing a fluid and further containing materials to be processed;

a driver for producing standing waves in said resonator for processing said materials; and means, including said driver and internal wall configuration of said resonator, for avoiding shock wave formation within said resonator.

17. The acoustic resonator as recited in claim 16 wherein said resonator includes a piston as part of the internal wall configuration and said driver is coupled to said piston for oscillating said piston.

18. The acoustic resonator as recited in claim 16 wherein said driver is coupled to said resonator for oscillating the entire resonator for producing said standing waves.

19. An acoustic resonator comprising:

a resonator containing a fluid and further containing materials to be processed; and a driver for oscillating the entire resonator for producing standing waves in said resonator for processing said materials.

20. A method of processing materials comprising the steps of:

providing a resonator;

configuring the internal wall shape of said resonator so as to avoid shock wave formation within said resonator;

providing a fluid for containment within said resonator;

introducing into said resonator materials to be processed;

producing standing wave in said resonator for processing said materials.

21. The method of claim 20 wherein said oscillation subjects said materials to at least one of the processes of: communition, agglomeration, de-agglomeration, granulization, sterilization, destruction of biological materials, separation, gasification, conversion of liquids into vapors and gases, drying, and chemical processing.

22. The method of claim 20 wherein said step of oscillating said resonator includes oscillating said resonator at variable amounts of power such as to effect different processing of said material based on said varying amount of power.

23. The method of claim 20 further comprising introducing said material into said resonator in a continuous manner, and causing said processed material to be removed from said resonator in a continuous manner during oscillation of said resonator and while producing said standing waves, whereby said material is processed in a continuous manner.

24. The method of claim 20 wherein the step of producing said standing wave includes oscillating the entire resonator.

25. A method of processing materials utilizing standing waves produced within a resonator comprising the steps of:

configuring the internal wall shape of said resonator so as to avoid shock wave formation within said resonator;

introducing said materials into said resonator;

producing a standing wave in said resonator for processing said materials.

26. The method of claim 25 wherein said oscillation subjects said materials to at least one of the processes of: communition, agglomeration, de-agglomeration, granulization, sterilization, destruction of biological materials, separation, gasification, conversion of liquids into vapors and gases, drying, and chemical processing.

27. The method of claim 25 wherein the step of producing said standing wave includes oscillating the entire resonator.

* * * * *